Aug. 25, 1931.  F. A. FAILING  1,820,788

AUTOMOBILE IDENTIFICATION DEVICE

Filed Dec. 18, 1930

WITNESSES

INVENTOR
Flora A. Failing
BY
ATTORNEYS

Patented Aug. 25, 1931

1,820,788

UNITED STATES PATENT OFFICE

FLORA A. FAILING, OF SCARSDALE, NEW YORK

AUTOMOBILE IDENTIFICATION DEVICE

Application filed December 18, 1930. Serial No. 503,313.

This invention relates to identification devices for automobiles, and particularly to an improved construction which may be applied to any of the lights of an automobile so that the owner of the automobile or other person may readily identify the car at night.

Another object of the invention is to provide an identifying device for automobiles whereby parked automobiles may be readily identified at a distance.

A still further object, more specifically, is to provide an identifying device for automobiles which includes a removable identifying letter or other member formed to removably fit over the headlight or parking light of an automobile, so that when the owner or other person sees the device he may readily identify same at a distance.

In the accompanying drawings—

Figure 1:
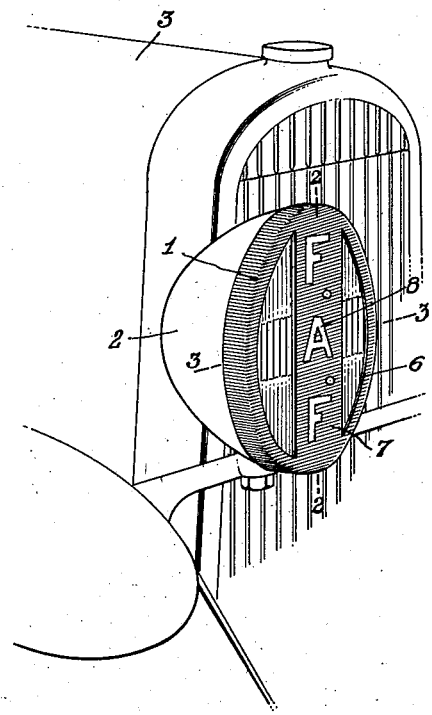
Figure 1 is a perspective view showing a small part of the front of an automobile, together with an embodiment of the invention in use.
Figure 2:
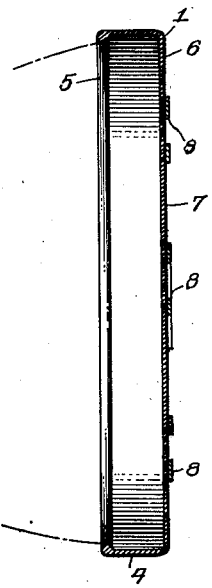
Figure 2 is a fragmentary sectional view through Figure 1 on the line 2—2, the same showing the device embodying the invention in section and part of a lamp in dot-and-dash lines.
Figure 3:
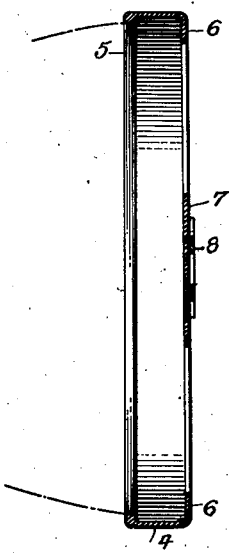
Figure 3 is a view similar to Figure 2 but presenting a horizontal section on the line 3—3 of Figure 1.

As illustrated in Figure 1, the identifying device 1 is mounted on the headlight 2 of an automobile 3, whereby when the light is used the identifying device is fully illuminated, thus permitting a person at a distance to identify the automobile. In many places, and particularly in suburban towns, parked cars all have the same appearance more or less at night and great difficulty has been experienced in finding a particular automobile, even though the owner is very familiar therewith. In order to permit the owner or other person to identify a particular automobile, the identifying device 1 is adapted to be used on the headlight, parking light, or, in fact, any light in an automobile. By using the identifying device on a light of an automobile, the same is fully illuminated and anyone familiar with the particular device may readily identify the automobile at a distance, thus obviating a search for the car.

While the identifying device of the present invention may be made in a number of different ways without departing from the spirit of the invention, one particular embodiment is shown in the accompanying drawings. In this embodiment a rubber body or ring 4 is provided having a bead 5 at the inner end and a turned over front flange 6, which at the center merges into a panel or plate 7 extending from the top to the bottom of the device. It is, of course, evident that this panel can be made horizontal or at some other angle without departing from the spirit of the invention. It is also understood that the bead 5 under some circumstances may be eliminated, although in many cases the bead is desirable because it reinforces the ring 4.

The entire device is preferably formed from very thin rubber which is more or less transparent, and by reason of its ability to stretch a single size may be applied to lights of different sizes, and when applied caused to function in a desired manner.

Preferably arranged on the panel 7 are one or more letters or other legends 8 held in place by cement or other holding means, whereby this part of the device will be more or less opaque and will thereby stand out so that any one may see the same at a distance. As shown in the accompanying drawings, the letters F A F are used and would ordinarily indicate that these letters are the initials of the owner of the automobile, although this is not essential.

Also, if desired, instead of having applied or raised letters or other legends, these letters or legends might be formed by removing certain parts of the panel, thus allowing the light to shine through the removed parts rather than to present an opaque letter.

The device may be left on the automobile lights any desired length of time, but preferably after the person seeking the car has entered the same, the device may be removed and stored in one of the pockets of the automobile ready for use at some later time.

Also, one or more of the devices may be used at the same time, so that a person approaching the car from any direction may see the identifying device and quickly recognize his automobile.

In forming the legends they may be made from any desired quantity of rubber and vulcanized or secured by adhesive as preferred. In forming the legends they may be of the same material as used in the body of the device but preferably are made from a different color so as to be more distinct.

What I claim is—

1. An automobile identifying device including a body adapted to overlap part of an automobile light, a panel carried by said body extending across the face of said light and carrying an identifying legend thereon, said body and panel being formed of stretchable and substantially transparent material.

2. An automobile identifying device including a substantially ring shaped body adapted to fit over part of the headlight of an automobile, and a panel merging into said body and extending across the face of the lamp, said panel carrying an identifying legend, said body being formed of resilient material adapted to grasp said lamp when the device is in use.

3. An automobile identifying device formed of thin stretchable rubber substantially transparent, said device including a body adapted to overlap part of the lamp, a flange extending from said body and overlapping part of the front of said lamp, a panel extending across said lamp from one part of said flange to the other, and a legend carried by said panel, said lamp being adapted to illuminate said legend.

4. An identifying device for automobiles comprising a ring body formed with a bead on one edge, and a flange on the opposite edge, said flange at one point merging into a transverse panel, said bead acting to grasp a lamp when in use and said panel being formed with an identifying legend positioned to be illuminated by said lamp when the device is in use.

FLORA A. FAILING.